Jan. 7, 1969 J. S. BOYD 3,420,631

PROCESS AND APPARATUS FOR THE PRODUCTION OF CARBON BLACK

Filed Sept. 30, 1966

United States Patent Office 3,420,631
Patented Jan. 7, 1969

3,420,631
PROCESS AND APPARATUS FOR THE
PRODUCTION OF CARBON BLACK
Joe S. Boyd, Franklin, La., assignor to Cabot Corporation,
Boston, Mass., a corporation of Delaware
Filed Sept. 30, 1966, Ser. No. 583,379
U.S. Cl. 23—209.4                    5 Claims
Int. Cl. C09c 1/48

The instant invention relates to a novel reactor for the production of carbon black and, more particularly, a reactor capable of providing high structure blacks for reinforcing elastomers such as rubber and the like. The invention also relates to a novel process for making carbon black.

A particular advantage of the reactor is the increased production rates of high-structure blacks, especially those of high surface area and tint strength, attainable therewith. Higher structure blacks are obtained with the instant reactor, than can be obtained with the somewhat similar reactors known to the prior art. This fact allows fuels having marginal utility, or even no utility, for production of relatively highly structured blacks to be more generally acceptable for use in the production of such blacks.

Applicant has achieved these advantages by adopting a radically new carbon black reactor design wherein a precombustion zone is provided by the erection of a means for dividing that portion of the carbon black reactor conventionally known as the combustion chamber into two sections, i.e. a precombustion zone and an oil-injection zone. The nature of the dividing means is of considerable importance, especially when used in conjunction with tangential gas ports as inlets into the precombustion chamber. In such a case, the dividing means advantageously comprises conduits tending to direct the circumferentially spinning gases in a more linear direction, i.e. more nearly parallel to the axial direction of the carbon black reactor.

Moreover, the advantages of the instant invention are best realized when the combustion chamber is separated from the quench chamber by a relatively narrow diametrical pasage formed by a refractory restrictor ring.

The most advantageous reactors of the invention are formed when the novel furnaces generally described above are used in conjunction with oil-pressure atomization burners of the type known in the art and particularly with such burners having spray tip angles of from 30° to 75°. Somewhat greater angles may be used effectively at higher oil preheat temperatures, for example, temperatures in the range of from 400 to 500° F.

In the specification and in the accompanying drawings are shown and described illustrative embodiments of the invention; modifications thereof are indicated, but it is to be understood that these are not intended to be exhaustive nor limiting of the invention, but on the contrary are given for the purposes of illustration in order that others skilled in the art may fully understand the invention and the manner of applying it in practical situations. The various objects, aspects and advantages of the present invention will be more fully undertsood from a consideration of the specification in conjunction with the accompanying drawing.

Figure 1:
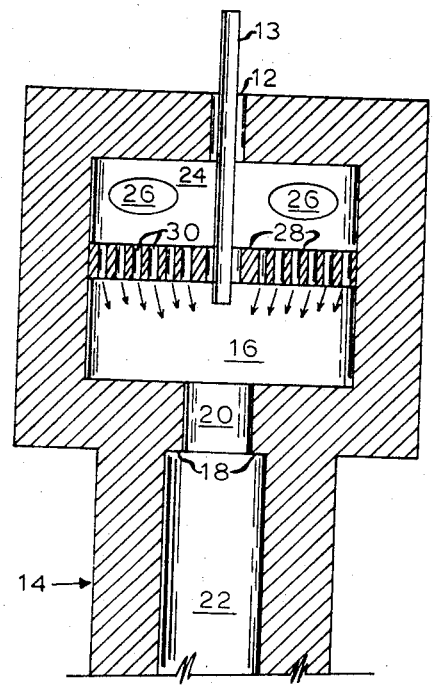
FIGURE 1 is a schematic section of a typical furnace constructed according to the invention.

Referring to the drawing, it is seen that a burner access port 12 enters furnace 14 providing access for an oil-pressure atomizing burner 13 to be mounted for discharge into chamber 16. Wall sections 18 of furnace 14 form a restrictor ring and a reduced diametrical flow passage 20 axially aligned with burner 13 through which gases flow into quench chamber 22. Diameter of port 12 is 9 inches, and passage 20 has a diameter of 7 inches. The quench chamber is 12 inches in diameter. The lateral lengths of each of the aforesaid chamber 16 and passage 20 is 15 inches and 9 inches respectively.

The oil tip can be of a configuration which will produce such various spray patterns as hollow cones, solid cones, or multiple spray patterns produced by multi-tip sprays.

It will be noted that furnace 14 comprises another chamber 24 hereinafter called the precombustion chamber. Fuel and oxidizing gases are introduced via tangential ports 26 into precombustion chamber 24. The tangential spin imparted to the gases results in a highly efficient mixing and rapid combustion. The heat from this combustion, is required to support the endothermic cracking of carbon black make oil which is sprayed into chamber 16 and converted therein under conditions of incomplete combustion to carbon and various by-products.

Figure 2:
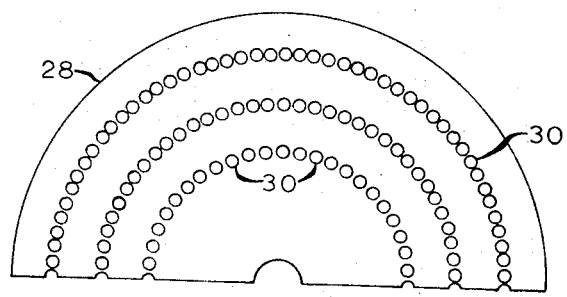
FIGURE 2 is a schematic elevational view of half of a divider of the type especially useful in a furnace of the invention.

A divider 28 constructed of refractory brick, separates chamber 16 from precombustion chamber 24. Divider 28 is about 9 inches in length and comprises 206 conduits 30 substantially equally spaced as shown in FIGURE 2. Conduits 30 of divider 28 provide means for imparting a controlled degree of linear flow to the tubulent combustion products created in precombustion chamber 24 as they enter chamber 16. The oil make supply through burner 13 is continuously injected into this relatively linear flow of gases. Thence, flow of the total effluent from chamber 16 is constricted by passage through passage 20 into quench chamber 22.

While applicant does not wish to be bound by any theory of operation, it is presently believed that the advantages achieved with the reactor of the invention are obtained because of the combination of excellent gas mixing (resulting from the high degree of turbulence in the precombustion chamber allowing the gas to be burned rapidly) providing gases largely comprised of combustion products, and the subsequent imparting to these gases of a relatively linear flow pattern in which the hydrocarbon make is decomposed. The increased separability of the combustion and cracking reactions in the instant furnace is believed to be a particular advantage. These factors especially in combination with flow through the restrictor ring, are believed to account for the excellent structure characteristics of the black.

The following series of three carbon black production runs illustrates some of the advantages of the instant invention. It is to be understood that these examples are merely illustrative and show the relative merits of the apparatus described in each example for the production of a certain type of carbon black (the type sold under the trade designation Vulcan 6, Vulcan 6H, and Vulcan 5H by Cabot Corporation). Similar advantages in respect to increased yields and rubber reinforcing properties may be obtained while making other types of oil furnace blacks. Advantages which are particularly evident in blacks produced with the apparatus of the invention are (1) improved structure as evidenced by higher oil absorption, less extrusion shrinkage, and higher modulus of rubber reinforced therewith and (2) improved tint. Similar furnaces not comprising a precombustion chamber cannot be utilized for the production of such black.

Before presenting the working examples and results thereof a discussion of the carbon black properties by which the blacks are judged is believed advantageous.

The term "structure" relates to a primary property of carbon black which is not influenced consistently by any property or combination of properties. In general, the term is used in the art to designate the extent of aggregation of the primary particles of a black and said aggregation is best evaluated by electron microscope examination. Since all furnace blacks manifest some degree of aggregation of the primary particles, a particular black is classified as being a low, normal or high structure black depending upon the relative degree of aggregation manifested thereby. Delineations between the classifications of low, normal or high structure are generally not well defined. A method has been derived, however, which is considered by those skilled in the art as being generally indicative of the amount of structure for related types of black. Said method is based on dibutyl phthalate (DBP) absorption of a particular black and is reported herein terms of cubic centimeters of DBP per 100 grams of black. Resistance to extrusion shrinkage of rubber compositions reinforced with a black is another good way to determine the structure of the black.

"Surface area" as measured by absorption of iodine by a black is primarily a measure of the porosity or "internal surface" area of a black being tested. This method is widely used as a control test for surface area and is also known in the art. The procedure is rapid and convenient. Within a given family of blacks the correlation of iodine surface area values with those obtained by the nitrogen test is good. The ASTM has provided a standard procedure for this iodine-absorption test under designation D1510-60. This procedure provides results in terms of milligrams of iodine absorbed per gram of black.

"Tint" is a characteristic of carbon black which defines its covering power. Tint is conveniently measured by mixing 0.1000 gram of carbon black to be tested with 3.000 grams of zinc oxide such as that sold under the trade name Florence Green Seal 8 by New Jersey Zinc Company, incorporating the dry mixture with 1.2000 grams of linseed oil in to a paste, forming a film 0.0015 inch thick with the paste, and then measuring the light transmission of the film with a Welsh Densichron. This instrument is known to the art and available from the W. M. Welch Manufacturing Company.

Abrasion resistance is obtained using the Akron Standard Angle Abrader, well known in the art and available from the Akron Standard Mold Company. The abrading stone utilized is an Aloxite stone of grit designation A46–06–V–30 and size designation 6 inch x 1 inch; this stone is sold under the trade name Aloxite by the Carborundum Company. For the purposes of the text, the stone is operated at 74 r.p.m. and with 8.53 kilograms force exerted by the stone on the sample. The specimen to be tested is placed on the abrasion machine shaft, set at 15° angle to the axis of the stone, and the results, i.e. the index number are $$\frac{\text{Average loss in weight of two wheels}}{\text{No revolutions} \times \text{specific gravity}} \times 10^6$$

Extrusion shrinkage was measured by extruding a sample of stock three consecutive times through a 0.1875 inch orifice of an extruder having a 1 3/16 inch screw. Screw speed is normally 60 r.p.m. The extruder used for the above testing may be identified as a Royle No. 1/2. The extrusion shrinkage is a measure of the diametrical swelling of the rubber sample as it moves through the extruder die at an approximate stock temperature of 170° F. and a die temperature of 155° F.

Although the apparatus and process of the invention are useful with those hydrocarbons generally known to be useful in making furnace carbon blacks, the following analysis is representative of the type of relatively low-grade tar used in the working examples in demonstrating the ability of the instant furnace to produce good blacks from oils of marginal utility.

ANALYSIS OF TYPICAL MAKE FUEL[1]

| | |
|---|---|
| Gravity (°API) | 0.0 |
| Saybolt viscosity (sec.): | |
| at 130° F. | 321 |
| at 210° F. | 55 |
| Asphaltenes _____percent__ | 0.2 |
| Benzene insolubles _____do____ | 0.000 |
| Hydrogen _____do____ | 8.11 |
| Carbon _____do____ | 88.81 |
| H/C ratio | 1.088 |
| Sulfur _____percent__ | 1.88 |
| Ash _____do____ | 0.002 |
| Sodium _____p.p.m.__ | 0.3 |
| Potassium _____do____ | 0.1 |
| Silica gel separation: | |
| Aromatics _____percent__ | 90.1 |
| Saturates _____do____ | 9.9 |
| Gas chromatographic distillation: | |
| 50% BP _____°F__ | 812 |
| BMCI | 123 |

[1] This fuel is sold under the tradename Mobil O.

The following examples are illustrative of the preparation of ISAF–HM black (sold under the trade designation Vulcan 6, by Cabot Corporation) an ISAF–HS black (sold under the trade designation Vulcan 6H by Cabot Corporation), a black sold under the designation Vulcan 5H by Cabot Corporation.

Example 1

Example 1 relates to production of the ISAF–HM black:

Combustion reactants comprised 88.7 thousand cubic feet per hour of air and 4.51 thousand cubic feet per hour of gases. These gases entered precombustion chamber 24 through tangential inlet ports 26. Another 7.36 thousand cubic feet per hour of air was continuously admitted annularly around the oil burner and by the spray tip.

An oil injection nozzle sold under the trade designation Sprayco 2124 having a spray angle of 30° was utilized to discharge 189 gallons per hour of make oil into chamber 16. Oil was supplied to the nozzle at 90 pounds per square inch. The oil was preheated to 300° F.

About 4.1 pounds of carbon black were obtained from each gallon of make oil utilized in this run. The produce is identified as Black No. 1 and its analytical and rubber properties are set forth in Tables I and II below.

Example 2

This example relates to making an ISAF–HS black. Combustion reactants comprised 88.6 thousand cubic feet per hour of air and 4.51 thousand cubic feet per hour of gases. These gases entered precombustion chamber 24 through tangential inlet ports 26. Another 7.36 thousand cubic feet per hour of air was continuously admitted annularly around the oil pipe and by the oil spray tip.

An oil injection nozzle sold under the trade designation SS–16 and having a spray angle of 45° was utilized to discharge 186 gallons per hour of make oil into chamber 16. Oil was supplied to the nozzzle at 62 pounds per square inch. The oil was preheated to 300° F.

About 4.2 pounds of carbon black were obtained from each gallon of make oil utilized in this run. The produce is identified as Black No. 2 and its analytical and rubber properties are set forth in Tables I and II below.

Example 3

This example relates to making Vulcan 5H. Combustion reactants comprised 88.7 thousand cubic feet per hour of air and 4.51 thousand cubic feet per hour of gases. These gases entered precombustion chamber 24 through tangential inlet ports 26. Another 7.36 thousand cubic feet per hour of air was continuously admitted.

An oil injection nozzle sold under the trade designation SS–16 and having a spray angle of 45° was utilized to discharge 236 gallons per hour of make oil into chamber 16. Oil was supplied to the nozzle at 100 pounds per square inch. The oil was preheated to 300° F.

About 4.1 pounds of carbon black were obtained from each gallon of make oil utilized in this run. The produce is identified as Black No. 3 and its analytical and rubber properties are set forth in Tables I and II below.

The following analytical data was obtained on the aforesaid blacks:

TABLE I

|  | Tint | DBPA absorption | Surface area, m.²/gram |
| --- | --- | --- | --- |
| Black No. 1 | 237 | 124 | 103 |
| Black No. 2 | 245 | 134 | 103 |
| Black No. 3 | 229 | 138 | 86 |

The rubber formulae to be identified in Table II as N and S are natural rubber and synthetic rubber formulations, respectively. The formulae are set out below:

N Formula

| Ingredients: | Parts |
| --- | --- |
| Natural rubber | 100.00 |
| Stearic acid | 3.00 |
| Zinc oxide | 5.00 |
| MBTS [1] | 0.60 |
| Sulfur | 2.50 |
| Black | 50.00 |

S Formula

| SBR–1500 | 100.00 |
| --- | --- |
| Stearic acid | 1.50 |
| Zinc oxide | 5.00 |
| MBTS [1] | 2.00 |
| Sulfur | 2.00 |
| Black | 50.00 |

[1] MBTS is benzothiazone disulfide.

Properties contributed by carbon black reinforcement of these formulations are listed in Table II.

TABLE II.—RUBBER PROPERTIES (PELLETS)

| Example | Black No. 1 | Black No. 2 | Black No. 3 |
| --- | --- | --- | --- |
|  | N Formula | | |
| Tensile, 30′ | 103 | 99 | 101 |
| Modulus, 300% | 113 | 118 | 120 |
| Abrasion | 94 | 101 | 114 |
|  | S Formula | | |
| Tensile, 50′ | 104 | 97 | 114 |
| Modulus, 300% | 107 | 112 | 119 |
| Ext. Shrink | 101.6 | 90 | 88.5 |

Those skilled in the art will recognize that properties of the illustrative blacks are such that they could not have been produced at practical rates of production on the "Phillips reactors" known to the art, which reactors are of the closest known basic design to the reactor of the invention when the divider between the precumbustion chamber and oil injection chamber is removed from the reactor of the invention.

What is claimed is:

1. In an apparatus for making high structure carbon black comprising a combustion chamber, an oil-feed probe mounted axially for discharge into said combustion chamber, a quench chamber and a reduced diametrical flow passage between said combustion chamber and quench chamber, the improvement consisting of,
    (a) a precombustion zone,
    (b) means for tangential introduction of reactants for combustion into said precombustion zone, and
    (c) a divider structure between said zone and said combustion chamber and a plurality of conduits in said divider structure, said conduits comprising means to convey combustion products in a substantially linear flow pattern from said precombustion zone into said combustion chamber.

2. Apparatus as in claim 1 wherein said conduits are substantially parallel to said oil-feed probe and concentrically spaced therefrom.

3. Apparatus as in claim 1 wherein said oil-feed probe comprises a pressure atomization nozzle.

4. In a process for making high structure carbon black in a reactor comprising a combustion chamber, an oil-feed probe mounted for axial discharge into said combustion chamber, and a quench chamber, the improvement comprising,
    (a) tangentially introducing a combustible reactant and an oxidizing agent into a precombustion zone, thereby providing spin and turbulence to said reactant, agent, and combustion products produced therefrom, and
    (b) passing said combustion products in a plurality of relatively linear paths through conduits in a divider means into said combustion chamber, said paths being substantially parallel to and in concentric relation with said oil-feed probe, thereby continually decomposing oil fed through said probe to form decomposition products including carbon black, and
    (c) passing said decomposition products through a reduced diametrical flow passage into said quench chamber.

5. A process as defined in claim 1 wherein said oil in preheated and ejected from said oil probe at a spray angle of 30° to 75°.

References Cited

UNITED STATES PATENTS 2,865,717 12/1958 Krejci _____ 23—209.4
2,976,127 3/1961 Latham _____ 23—259.5
3,071,443 1/1963 Bellew _____ 23—209.4

EDWARD J. MEROS, *Primary Examiner.*

U.S. Cl. X.R.

23—259.5